United States Patent
Zugic

(10) Patent No.: US 12,157,104 B2
(45) Date of Patent: Dec. 3, 2024

(54) ELECTRICALLY DRIVEN CHEMICAL REACTOR USING A MODULAR CATALYTIC HEATING SYSTEM

(71) Applicant: Lydian Labs, Inc., Cambridge, MA (US)

(72) Inventor: Branko Zugic, Salem, MA (US)

(73) Assignee: Lydian Labs, Inc., Cambridge, MA (US)

(*) Notice: Subject to any disclaimer, the term of this patent is extended or adjusted under 35 U.S.C. 154(b) by 0 days.

(21) Appl. No.: 18/486,328

(22) Filed: Oct. 13, 2023

(65) Prior Publication Data
US 2024/0042412 A1  Feb. 8, 2024

Related U.S. Application Data

(63) Continuation of application No. PCT/US2022/025133, filed on Apr. 15, 2022.

(60) Provisional application No. 63/175,222, filed on Apr. 15, 2021.

(51) Int. Cl.
| | |
|---|---|
| *B01J 19/24* | (2006.01) |
| *C01B 3/04* | (2006.01) |
| *C01B 32/40* | (2017.01) |

(52) U.S. Cl.
CPC .......... *B01J 19/2415* (2013.01); *C01B 3/045* (2013.01); *C01B 32/40* (2017.08)

(58) Field of Classification Search
CPC ...... B01J 19/2415; C01B 3/045; C01B 32/40; C01B 3/16; C01B 2203/0238; C01B 2203/085; C01B 2203/0855; C01B 3/40; C01B 3/042; Y02P 20/52
USPC .................................................. 422/202
See application file for complete search history.

(56) References Cited

U.S. PATENT DOCUMENTS

| | | |
|---|---|---|
| 3,477,827 A | 11/1969 | Mott |
| 3,541,729 A | 11/1970 | Dantowitz |
| 2019/0118264 A1 | 4/2019 | Qi et al. |
| 2020/0354216 A1 | 11/2020 | Mortensen |
| 2021/0113983 A1 | 4/2021 | Mortensen et al. |
| 2021/0238035 A1 | 8/2021 | Mortensen et al. |
| 2022/0306559 A1 | 9/2022 | Mortensen et al. |

FOREIGN PATENT DOCUMENTS

| | | |
|---|---|---|
| GB | 1547810 A | 6/1979 |
| WO | WO-2019/228797 A1 | 12/2019 |
| WO | WO-2021/110809 A1 | 6/2021 |

(Continued)

OTHER PUBLICATIONS

International Search Report and Written Opinion for Application No. PCT/US23/35537 dated Feb. 6, 2024.

(Continued)

*Primary Examiner* — Huy Tram Nguyen
(74) *Attorney, Agent, or Firm* — Jeffrey Schox; Randy Mehlenbacher

(57) ABSTRACT

A reactor system including a plurality of catalytic modules connected end-to-end, forming a passage for reactants to pass through individually heated catalytic heating elements, thereby producing products. Each catalytic module has an insulating housing containing a catalytic heating element and configured to pass reactants over the catalytic heating element. A conductor in the module applies electricity to the catalytic heating element, which operates as a combined catalytic material and heating element.

21 Claims, 6 Drawing Sheets

(56) References Cited

FOREIGN PATENT DOCUMENTS

WO     WO-2022/221740 A1    10/2022

OTHER PUBLICATIONS

International Search Report and Written Opinion for International Application No. PCT/US2022/025133 dated Jul. 14, 2022.

ELECTRICALLY DRIVEN CHEMICAL REACTOR USING A MODULAR CATALYTIC HEATING SYSTEM

CROSS-REFERENCE TO RELATED APPLICATIONS

This application is a Continuation of International Patent Application No. PCT/US22/25133, filed Apr. 15, 2022; which claims the benefit of and priority to U.S. Provisional Patent Application No. 63/175,222, filed Apr. 15, 2021, the entire disclosure of each of which is hereby incorporated herein by reference.

TECHNICAL FIELD

The present application relates generally to chemical reactors and, more particularly but not exclusively, to electrically-heated chemical reactors employing one or more catalytic modules.

BACKGROUND

Many chemical reactors used for the production of commodity and/or fine chemicals depend on the combustion of fossil fuels, such as natural gas, oil, and coal, for heat or energy supply. The transfer of this heat to the catalyst and reactant stream is often inefficient due to limited burner efficiency and heat transfer losses to ambient air, to the reactor wall, and to the inert packing in the reactor, to name a few. This results in poor thermal efficiency of the reactor system. Furthermore, catalyst effectiveness may be limited due to mass transfer limitations.

To improve overall energy efficiency, fossil fuel-driven chemical plants utilize costly heat exchange equipment, steam management systems, and other system/process controls. As a result, large, centralized chemical plants are required to take advantage of economies of scale. Due to poor startup-shutdown event handling, these plants must be run at extremely high-capacity factors.

The carbon footprint of fossil fuel-based reactor systems is significant. In some cases, more than 40% of the $CO_2$ emitted from a chemical plant can be attributed to the combustion of fuel. This creates a $CO_2$ stream that is difficult to decarbonize due to low $CO_2$ concentrations and impurities present in the flue gas stream. With growing concern over worldwide $CO_2$ emissions, these difficult-to-capture emissions will likely become an additional cost imposed on existing chemical plants.

An alternative to fossil fuel-driven heat supply is to provide the heat electrically. The growing availability of renewable energy makes the electrification of reactor systems interesting for both financial and environmental reasons. To provide process efficiency gains to the system in a cost-effective manner, the electrically driven heat supply to the relevant reactor components (i.e., the interface of the catalyst and reactants) must be optimized.

Previous electrification attempts consider the introduction of electrical heating components such as cartridge-style heating elements, resistively-heated reactor tubes, heat pumps, or traditional catalyst nanoparticles composed of materials susceptible to induction-based heating. While these system designs offer some degree of electrification, they all suffer from efficiency limits—e.g., at least one of energy efficiency, catalyst utilization efficiency, mass transfer efficiency—or operational difficulties, such as the formation of hot spots, poor heat distribution, and poor process control systems.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

The present disclosure is related to systems and methods for chemical conversion using an electrically-driven thermal conversion system and, more particularly, to systems and methods of converting carbon-based feedstocks (e.g., natural gas, $CO_2$) to fuels and chemicals using renewable energy. The subject matter of the present invention involves, in some cases, interrelated products, alternative solutions to a particular problem, and/or a plurality of different uses of one or more systems and/or articles.

In one aspect, embodiments of the present invention relate to a catalytic module having an insulating housing, a catalytic heating element contained within the insulating housing and configured to allow for the passage of reactants through the catalytic heating element, and a conductor configured to apply electricity to the catalytic heating element, wherein the catalytic heating element is a combination of a heating element and a catalytic material and the catalytic module is configured to connect with a second catalytic module.

In some embodiments the conductor heats the catalytic heating element through the application of electrical power. The heating may be resistive or inductive.

In some embodiments the catalytic heating element is a metallic or ceramic structure including at least one of Ni, Al, Cu, Au, Ag, Fe, Co, Pt, Pd, C, In, Ta, W, Sn, In, or Zn.

In some embodiments the catalytic heating element has a metal oxide coating or component including at least one of Al, Cr, Fe, Co, Na, K, Mg, Ca, Mn, Sn, Si, La, Pr, Ce, or Zn.

In some embodiments the catalytic heating element includes a promotional additive having at least one of Na, K, Mg, Ca, P, Mg, Mn, Ta, La, Pr, Ce, or Nb.

In some embodiments the catalytic heating element is fabricated by templating, 3D printing, extrusion, ball milling, sintering, dealloying, metallurgical foaming, powder metallurgy, polymer sponge templating, or direct ink writing to create a 3-dimensional structure having a size in a range from 1 micron to 1 meter.

In some embodiments the catalytic heating element is hierarchically structured. The hierarchical structuring may be achieved by surface treatment that may include dip coating, corrosion, electroplating, electrooxidation, electroreduction, galvanic exchange, wetness impregnation, deposition precipitation, or other surface modification techniques. The hierarchical structuring may be with respect to structure, pore size, composition, surface area, or active materials.

In some embodiments the catalytic heating element has a high surface area. The surface area may between 0.01 and 1000 $m^2/g$.

In some embodiments the catalytic module includes a first spacer and a second spacer closing the insulating housing and the catalytic module is configured to connect with a second catalytic module at the first spacer, the second spacer, or both. In some embodiments at least one of the first spacer, the second spacer, or the insulating housing are ceramic.

In some embodiments the conductor is centered in the catalytic heating element.

In another aspect, embodiments of the present invention relate to a reactor having a plurality of the aforementioned catalytic modules, an inlet at the proximal end of the reactor for receiving reactants, and an outlet at the distal end of the reactor for outputting products. The plurality of the catalytic modules are connected end-to-end and form a passage for reactants through the individual catalytic heating elements. Each conductor applies power to its catalytic heating element independent of the power applied to the other catalytic heating elements. The products are generated by the passage of reactants through the individual catalytic heating elements as they are heated through the application of electrical power.

In some embodiments the reactor is configured to be operated at a temperature in a range from 0 to 2500° C. and at a pressure in a range between 1 and 500 bar.

In some embodiments the reactor has a shape configured to promote gas-solid interactions and internal mixing.

In some embodiments power is supplied equally to each of the catalytic heating elements.

In some embodiments power is supplied to each of the catalytic heating elements based on heating requirements.

In some embodiments the reactor is a tube-in-tube configuration having an annulus and a center, the annulus and the center are filled with different materials; and the reactor system is a compact, electrically-driven, two-stage reactor system. In some embodiments the reactor is configured induce an exothermic reaction in the center, release heat from the center, and transfer the released heat efficiently to an endothermic process.

In yet another aspect, embodiments of the present invention relate to a method for converting $CO_2$ to CO via a reverse water-gas shift reaction. The method includes feeding a mix of $CO_2$ and $H_2$ to the aforementioned reactor system, passing $CO_2$ and $H_2$ over the catalytic heating element in each catalytic module in the reactor; and generating heat in each catalytic module by at least one of resistive heating, inductive heating, dielectric heating, or frequency-based heating, thereby converting $CO_2$ to CO via a reverse water-gas shift reaction.

In another aspect, embodiments of the present invention relate to a method for converting $CO_2$ to CO via a dry methane reforming reaction. The method includes feeding a mix of $CO_2$ and $CH_4$ to the aforementioned reactor system, passing the mix of $CO_2$ and $CH_4$ over the catalytic heating element in each catalytic module in the reactor; and generating heat in each catalytic module by at least one of resistive heating, inductive heating, dielectric heating, or frequency-based heating, thereby converting CO2 to CO via a dry methane reforming reaction.

In still another aspect, embodiments of the present invention relate to a method for converting $H_2O$ to $H_2$ via a thermochemical water splitting reaction. The method includes feeding $H_2O$ to the aforementioned reactor system, passing the $H_2O$ over the catalytic heating element in each catalytic module in the reactor; and generating heat in each catalytic module by at least one of resistive heating, inductive heating, dielectric heating, or frequency-based heating, thereby converting $H_2O$ to $H_2$ via a thermochemical water splitting reaction.

BRIEF DESCRIPTION OF DRAWINGS

Non-limiting and non-exhaustive embodiments of the invention are described with reference to the following figures, wherein like reference numerals refer to like parts throughout the various views unless otherwise specified.

Figure 1:
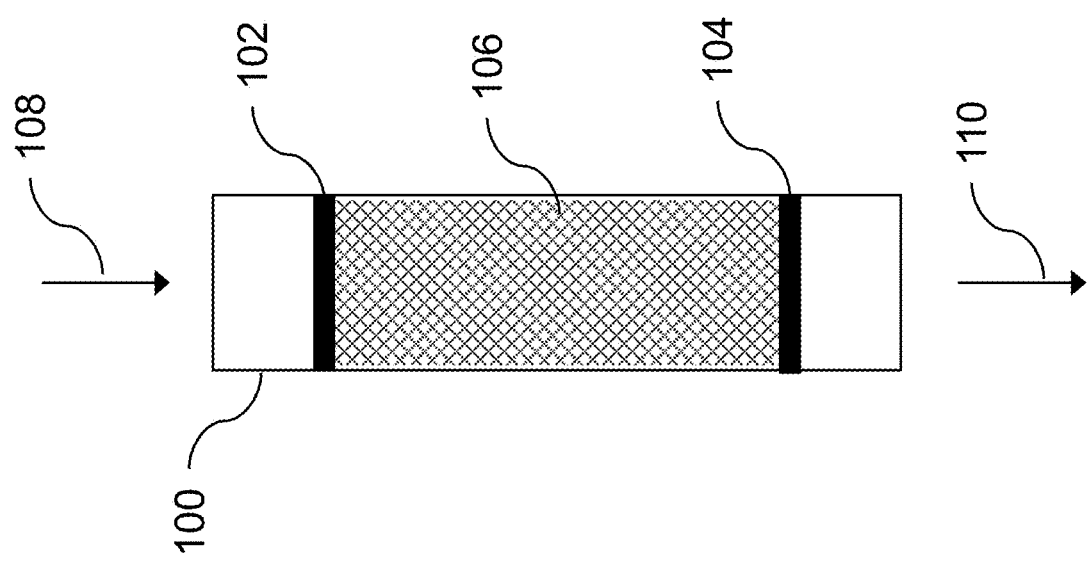
FIG. 1 illustrates a resistively heated catalytic module in accordance with one embodiment.

Further, persons skilled in the art to which this disclosure belongs will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those of ordinary skill in the art having the benefit of the description herein.

DETAILED DESCRIPTION

For the purpose of promoting an understanding of the principles of the disclosure, reference will now be made to the embodiment(s) illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will also be understood by those skilled in the art that the foregoing general description and the following detailed description are exemplary and explanatory of the disclosure and are not intended to be restrictive thereof.

The terms "comprises," "comprising," or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment," "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limiting. Embodiments of the present disclosure will be described below in detail with reference to the accompanying figures.

Embodiments of the present invention relate to a reactor design that is electrified as compared to traditional combustion-fired reactors. The design allows for parallel arrangements of reactor tubes, each tube containing individual heating elements that can be mixed, matched, or individually controlled to provide a significant amount of process flexibility.

Each reactor is, in turn, comprised of a plurality of connected catalytic modules. Each module includes a catalytic heating element that is a combination of a heating element and a catalytic material, a conductor for supplying electrical power to the catalytic heating element, and various structural components such as spacers and an insulating housing to contain the catalytic heating element and allow for the passage of reactants through the catalytic heating element. In some embodiments one or more conductors supply an even distribution of current to the catalytic heating element to generate heat within the element. The voltage applied may range from 0 to 5000V and the current may range from 0 to 1000 A.

The catalytic heating element may be a three-dimensionally structured catalytic material, such as nanostructured catalytic materials. When connected into a linear reactor configuration, the catalytic modules form a passage for reactants to pass through the connected catalytic heating elements and the conductors are able to individually apply electrical power to heat the various catalytic heating elements.

In some embodiments the conductor is centered in the catalytic heating element. In other embodiments conductors are located at opposite ends of the catalytic heating element. The connections are always of a low resistance such that the catalytic heating elements are the primary source of resistance in the circuit. A single conductor may serve as a common electrical ground for a linear reactor configuration of the modules.

The combination of a heating element and catalytic material into a single, high surface area component allows heat to be efficiently applied to the reactants using electricity and allows the reactor to be heated at least partially using renewable energy sources. The catalytic heating element may be fabricated by scalable additive and subtractive manufacturing techniques, such as at least one of templating, 3D printing, ball milling, sintering, extrusion, casting, dealloying, direct ink writing, or other means of creating a three-dimensional structure in the micron to meter scale. This is described in U.S. patent application Ser. No. 15/790,810, filed on Oct. 23, 2017, the entire disclosure of which is hereby incorporated by reference as if set forth in its entirety herein.

Various embodiments of the catalytic heating element may be fabricated so as to form a hierarchical structure, i.e., a structure with at least two levels of pore sizes: large pores which act as mass transport "highways" that allow the reactants to diffuse to small pores and nanosized pores that provide high surface area and thus are responsible for reacting with the reactants. The structure may also have hierarchical layers of distinct phases or compositions (e.g., an underlying metallic substrate, and oxide layer, and deposited active metal species).

The nanoscale design considerations allow a user to control at least one of: the catalyst composition, which may be customized to the desired reaction in some embodiments; resistivity, which determines the electrical input required to heat the catalytic heating element in some embodiments; macro-scale structure, which allows the shape to be optimized for high reaction conversions in some embodiments; or any combination thereof.

Using these parameters, the catalytic heating element may be designed in a manner such that the heat is produced in the reactor largely via the catalytic material, and only via the catalytically active sites in some embodiments. Furthermore, the macroscopic shape of the catalytic heating element may be designed in order to maximize heat transfer and interaction with the gas phase reactants.

A reactor operating using the catalytic module approach of the current application can be applied to any number of chemical transformation steps by modifying the composition, structure, and porosity of the individual elements and their configuration in the reactor stack. Some examples of chemical transformation steps that may be implemented using this approach include steam methane reforming, dry methane reforming, reverse water-gas shift, thermochemical water splitting, Fischer Tropsch processing, the Haber-Bosch reaction (ammonia production), methanol production, olefin synthesis, combinations thereof, and others.

Embodiments differ from traditional chemical reactors as heat is provided electrically (via a resistive, inductive, and/or dielectric high frequency heating mechanism) instead of by the burning of fossil fuels. Some reactor designs may also be based on the use of electricity for heat generation or using an electrochemical reaction system, which is usually accomplished either by the integration of a traditional catalyst architecture, such as metal nanoparticles on a metal oxide support powder with a resistive heater, or by the incorporation of other resistive heating elements into the reactor or catalyst bed.

In some embodiments, catalytic material may be derived from a metal structure that is dealloyed using e.g., free corrosion or electrochemical dealloying to create a nanoporous material of predetermined composition and porosity, allowing its composition, surface area, and resistivity to be controlled through the resulting nanostructure and tailoring to a specific reaction and/or process. Furthermore, due to advances in additive manufacturing technology, the macroscopic (micrometer to centimeter scale) structure of the catalytic heating element may be flexibly designed and fabricated in order to optimize fluid-solid interactions in some embodiments.

The resulting composition and porosity may contribute to the resistivity of the material, which may be tuned to efficiently take advantage of the power input in order to provide adequate heat to the reactor system. The catalytic heating element may be further modified to stabilize the structure and modify the activity of the material through the deposition of metals or metal oxides by a variety of techniques including incipient wetness impregnation, physical vapor deposition, chemical vapor deposition, atomic layer deposition, galvanic exchange, electroplating, dip coating, oxidation and reduction processes, etc. in some embodiments.

Due to the efficiency advantages offered by the improved heat supply and decrease of mass transfer limitations, embodiments of the reactor unit may be decreased in size by two orders of magnitude compared to traditional catalytic reactor systems. Furthermore, the plant design may be greatly simplified by eliminating the need for extensive heat exchange equipment. In some embodiments, the temperature response time of a reactor based on this technology may be very rapid compared to traditional, large reactors. In comparison to traditional reactor systems, embodiments may have lower capital costs due to smaller and simpler reactor systems, full electrification and rapid response time that allows for the use of fluctuating renewable energy inputs to drive production, and decentralization of chemical production (which eliminates transportation costs and enables production in remote areas).

FIG. 1 depicts one embodiment of a resistively heated catalytic module 100. As shown, the module 100 has two current distribution plates 102, 104 that may be affixed to the catalytic heating element 106 by suitable means (e.g., soldering, compression, etc.) and power may thereby be applied from a power source (either AC or DC). The voltage and current requirements depend on the resistance of the catalytic heating element, the temperature requirement of the ambient environment, heat/energy transfer dynamics, and the chemical reaction (e.g., exothermic or endothermic) in some embodiments. The reactants 108 flow into the reactor 100 and the products 110 flow out of the reactor 100.

Figure 2:
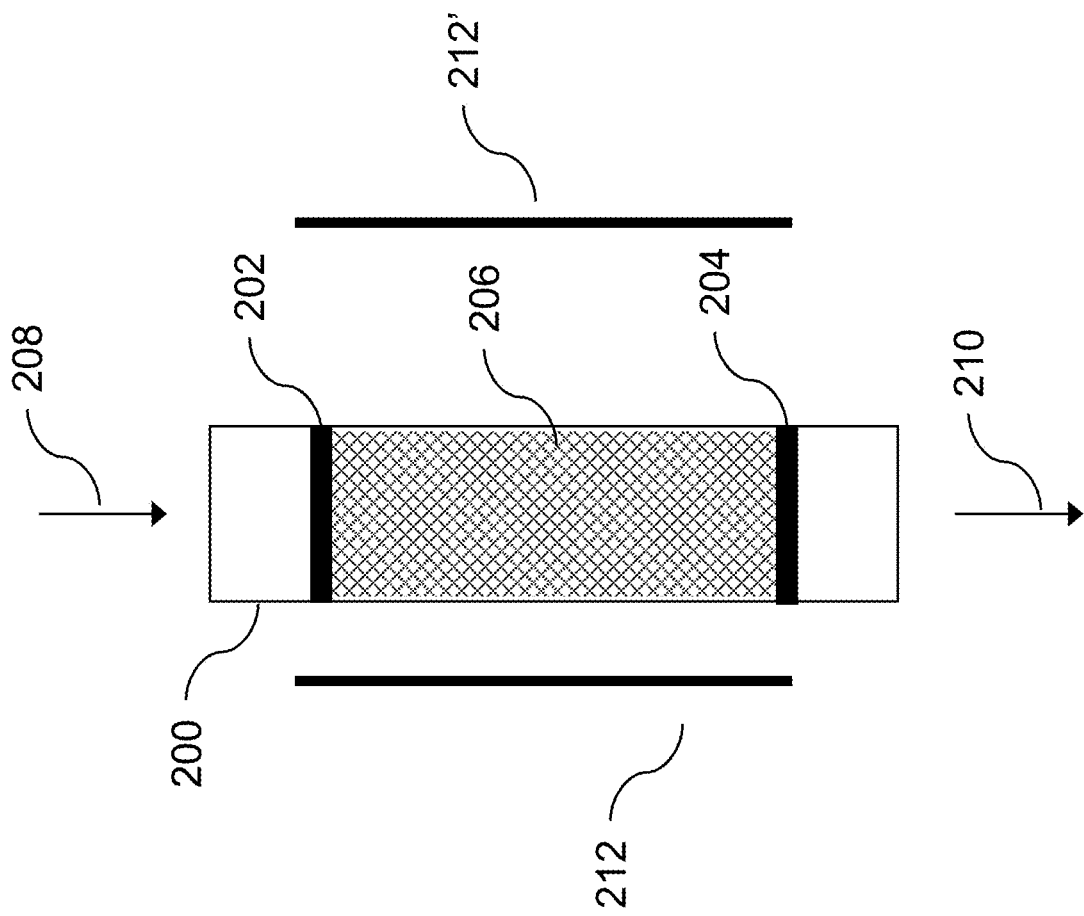
FIG. 2 illustrates an inductively heated catalytic module in accordance with one embodiment.

FIG. 2 depicts one embodiment of an inductively heated catalytic module 200, which is identical to the module 100 of FIG. 1 except for the addition of electromagnetic coils 212, 212'. In this embodiment, there is no physical connection between the catalytic heating element 206 and the power source. Instead, the current distribution plates 102, 104 are replaced by spacers 202, 204 that hold the catalytic heating element 206 in place. The inductive coils 212, 212' may be placed in proximity to the module 200 and an AC current source may be used to drive the heating of the catalytic heating element 206 via magnetic hysteresis and eddy currents. The reactants 208 flow into the reactor 200 and the products 210 flow out of the reactor 200.

Both of these heating modes provide advantages over traditional catalytic reactors because they are able to readily and rapidly respond to changes in power availability (e.g., intermittently available renewable energy), reactant supply, and startup/shutdown events. These advantages make this type of system suitable for renewable energy-driven chemical processing.

In other embodiments, high-frequency dielectric heating configurations may be employed to generate heat. In this configuration, electrodes are placed around the catalytic heating element and an alternating current of a frequency tuned specifically to the process is applied. This type of system provides flexibility regarding the reactor shape as it is more amenable to flat, plate-type reactor designs.

The module may have a non-reactive housing for the catalytic heating element that is configured to direct the reactant stream over the catalytic heating element. It may be designed to accommodate multiple catalytic heating elements, which may be arranged in series to provide a complete process stream in some embodiments. Furthermore, at least one of the enclosure or a surface outside the enclosure may be coated with a polished material, such as gold, copper, or aluminum, to improve the energy efficiency of the system by preventing radiant energy emitted from the catalytic heating element at high temperatures from leaving the system in some embodiments.

The catalytic module (or a reactor having a plurality of connected catalytic modules) in any of the embodiments described herein can be operated at a range of temperatures (from 0 to 2500 degrees Celsius) and pressures (between 1 and 500 bar) in order to achieve the desired reaction and/or product stream characteristics.

Figure 3:
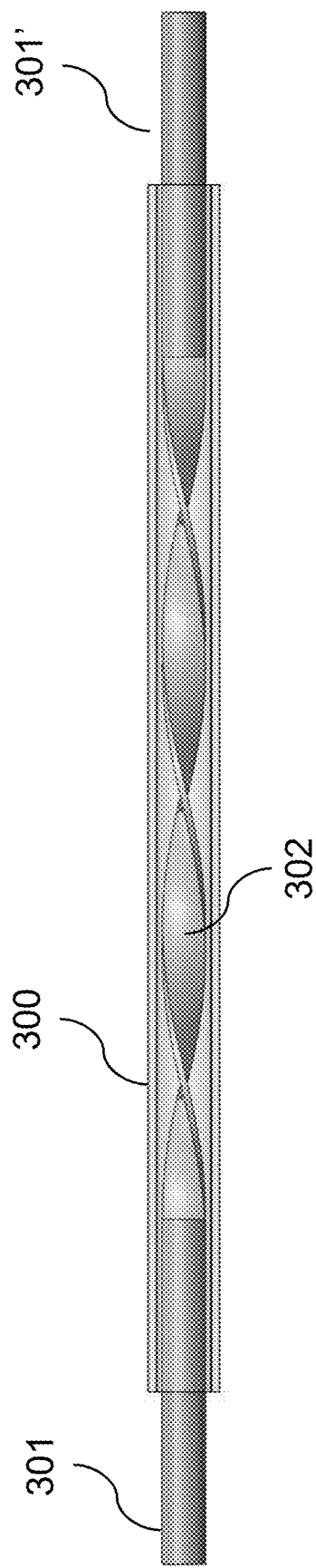
FIG. 3 illustrates a spirally structured catalytic heating element in accordance with one embodiment.

FIG. 3 shows a housing 300 containing a catalytic heating element 302 shaped like a static mixer with electrode connections 301, 301' on either end for the supply of current to the element 302. The shape of the element 302 promotes the mixing of reagents as they pass through catalytic module and over the catalytic heating element 302. This shape promotes mixing and ensuring that none of the gas bypasses the catalytic element.

Figure 4A:
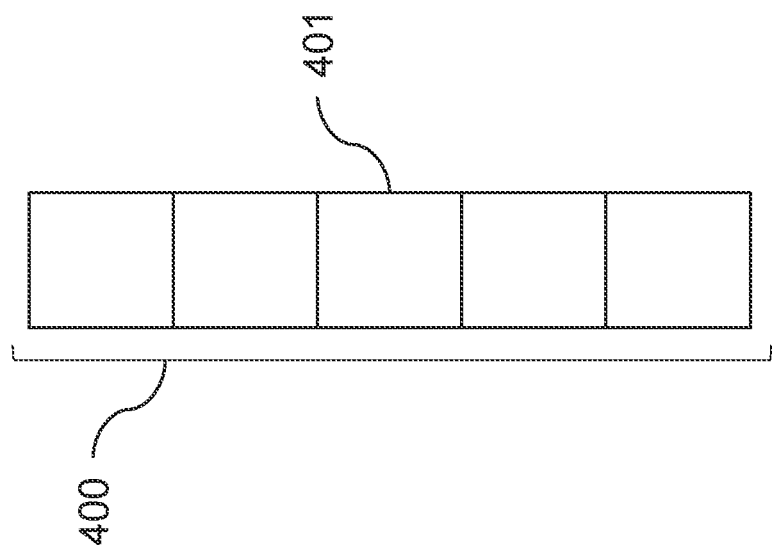
FIGS. 4A, 4B, and 4C illustrate the arrangement of catalytic modules in different reactors having varying temperature, structure, or composition according to various embodiments.
Figure 4B:
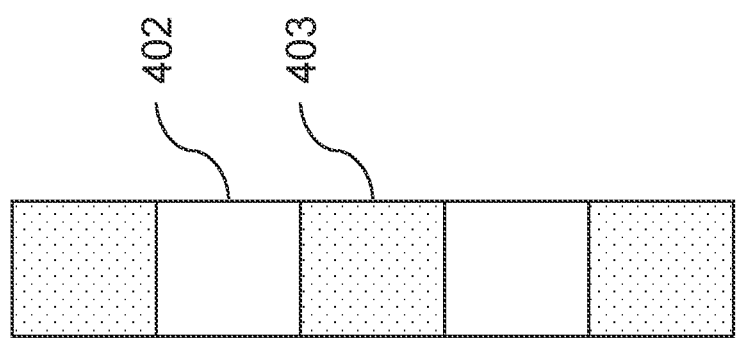
Figure 4C:
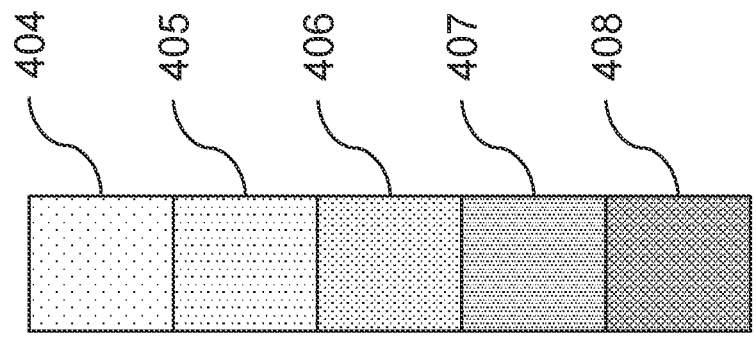

FIG. 4 illustrates three hypothetical reactors 400 formed from stacks of catalytic modules ("cells") 401-08. The reactors in A, B, and C are each composed of a plurality of catalytic modules. In accord with the present invention, each cell can have its own catalytic heating element that varies from other catalytic heating elements in the reactor by composition, temperature, structure, etc.

In this particular, non-limiting, hypothetical embodiment, reactor 400A is composed of a linear configuration of five identical catalytic modules.

In this particular, non-limiting, hypothetical embodiment, reaction 400B is composed of a linear configuration of two catalytic modules 402 and three catalytic modules 403. Module 402 has a different composition from module 403.

In this particular, non-limiting, hypothetical embodiment, reactor 400C is composed of a linear configuration of five catalytic modules 404-08. Modules 404-08 are chemically and structurally identical, but controlled to operate at different temperatures during the operation of the reactor.

Figure 5:
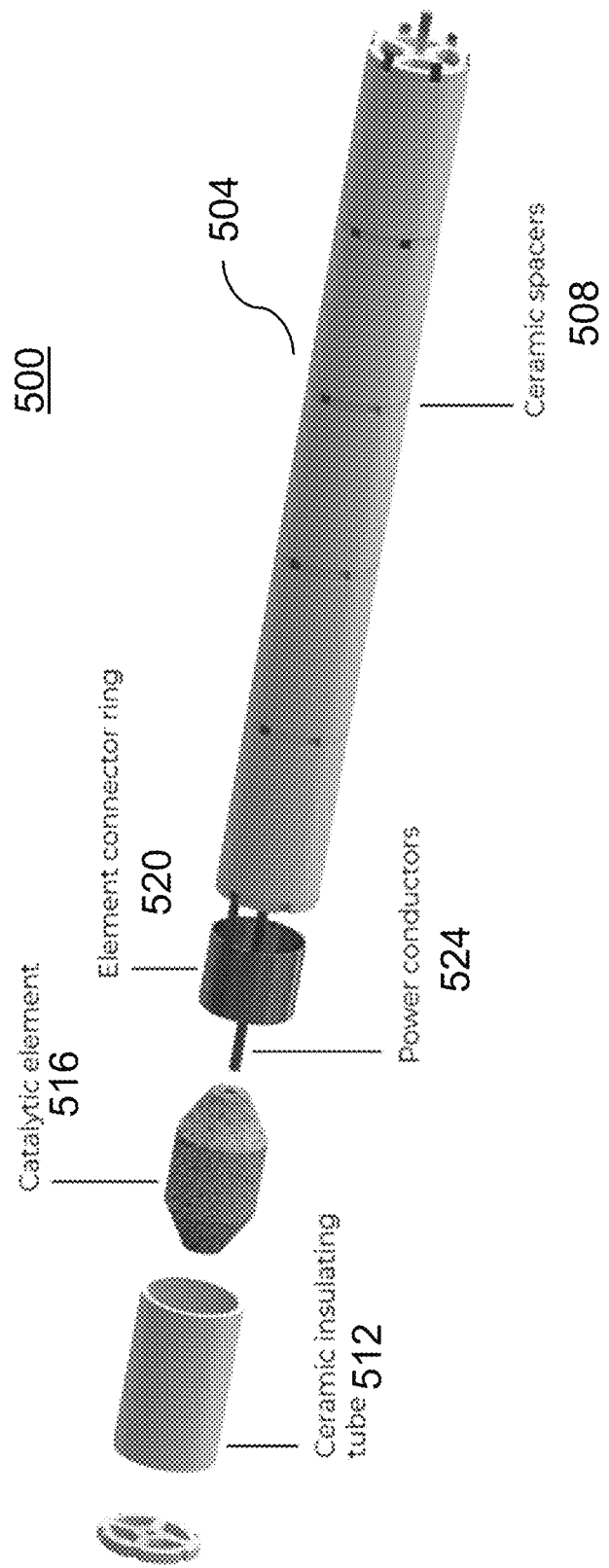
FIG. 5 is an exploded view of a catalytic module in a reactor configuration with other catalytic modules.

FIG. 5 shows an exploded view of a reactor in accord with the reactors depicted in FIG. 4. This reactor 500 is a linear configuration of six catalytic modules 504, with each pair of modules 504 separates by a ceramic spacer 508.

Each catalytic module 504 is composed of a ceramic insulating tube 512 containing a catalytic heating element 516, a connector ring 520 containing embedded conductors, and a central conductor 524. In this embodiment, the ring 520 enables electrical power to be applied individually to the heating element 516 while conductor 524 provides an electrical ground completing the circuit. The same is true of the other modules 504 in the reactor 500, allowing each catalytic heating element 516 to be heated individually. Connected end-to-end, the modules 504 form a pathway for reactants and finished outputs.

Figure 6:
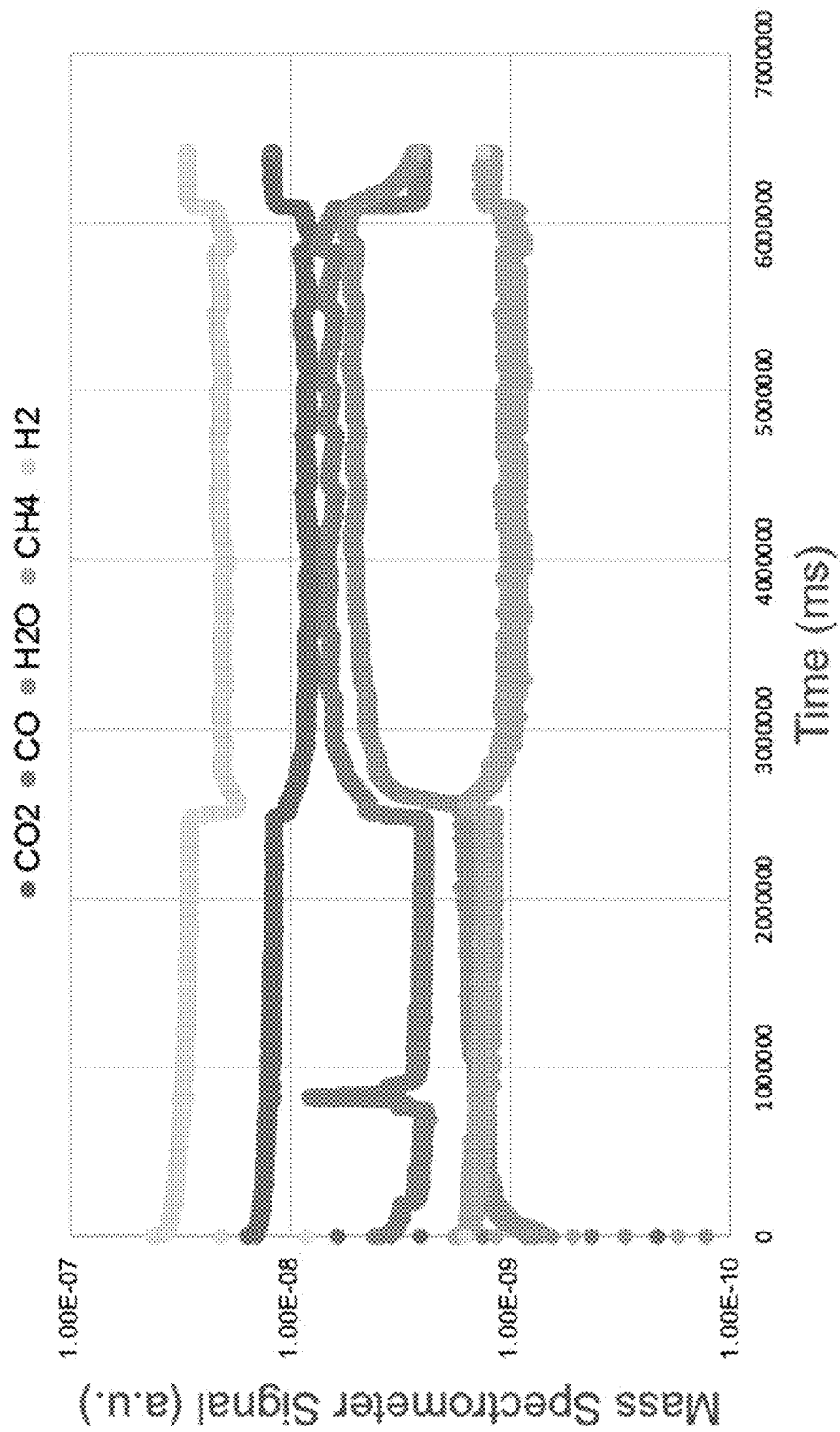
FIG. 6 is a graph showing the performance of an electrically heated nickel-based catalytic element for the conversion of $CO_2$ to CO via the reverse water-gas shift reaction in accordance with one embodiment.

FIG. 6 is a graph showing the performance of an electrically heated nickel-based catalytic element for the conversion of $CO_2$ to CO via the reverse water-gas shift reaction in accordance with one embodiment. In this embodiment, the catalytic heating element was a nickel-based metal foam connected to two stainless steel conductors on either end of the foam. A mixture of $CO_2$ and $H_2$ (up to 50% $CO_2$ and up to 90% $H_2$) was passed through the element as the element was heated by the application of current. The conversion shown occurs when the element reached approximately 600° C. The high selectivity to CO (no methanation) is important for the energy efficiency of the system.

In some embodiments, the conversion is performed using a multi-module reactor, passing the $CO_2$ feed over the catalytic heating element in each catalytic module in the reactor; and generating heat in each catalytic module by at least one of resistive heating, inductive heating, dielectric heating, or frequency-based heating, thereby converting $CO_2$ to CO via a reverse water-gas shift reaction.

$CO_2$ may also be converted to CO via a dry methane reforming reaction. In this case a gas mixture containing up to 60% $CO_2$ and up to 60% $CH_4$ is fed to the aforementioned reactor system, passing the feed over the catalytic heating element in each catalytic module in the reactor and generating heat in each catalytic module by at least one of resistive heating, inductive heating, dielectric heating, or frequency-based heating, thereby converting $CO_2$ to CO via a dry methane reforming reaction.

In other embodiments, H$_2$O may be converted to H$_2$ and an oxide (or oxide derivative) via a thermochemical water splitting reaction. H$_2$O is fed into the aforementioned reactor system, passing the feed over the catalytic heating element in each catalytic module in the reactor and generating heat in each catalytic module by at least one of resistive heating, inductive heating, dielectric heating, or frequency-based heating, thereby converting H$_2$O to H$_2$ via a thermochemical water splitting reaction.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A catalytic module comprising:
   an insulating housing comprising a first spacer and a second spacer closing the insulating housing, wherein the catalytic module is configured to connect with a second catalytic module at the first spacer, the second spacer, or both;
   a catalytic heating element contained within the insulating housing and configured to allow for a passage of reactants through the catalytic heating element; and
   a conductor configured to apply electrical power to the catalytic heating element when electrical power is applied to the conductor,
   wherein the catalytic heating element is a combination of a heating element and a catalytic material.

2. The catalytic module of claim 1, wherein the conductor heats the catalytic heating element through the application of electrical power.

3. The catalytic module of claim 2, wherein the heating is resistive or inductive.

4. The catalytic module of claim 1, wherein the catalytic heating element:
   is a metallic or ceramic structure comprising at least one of Ni, Al, Cu, Au, Ag, Fe, Co, Pt, Pd, C, In, Ta, W, Sn, In, or Zn;
   has a metal oxide coating or component comprising at least one of Al, Cr, Fe, Co, Na, K, Mg, Ca, Mn, Sn, Si, La, Pr, Ce, or Zn; or
   comprises a promotional additive comprising at least one of Na, K, Mg, Ca, P, Mg, Mn, Ta, La, Pr, Ce, or Nb.

5. The catalytic module of claim 1, wherein the catalytic heating element is fabricated by templating, 3D printing, extrusion, ball milling, sintering, dealloying, metallurgical foaming, powder metallurgy, polymer sponge templating, or direct ink writing to create a 3-dimensional structure having a size in a range from 1 micron to 1 meter.

6. The catalytic module of claim 1 wherein the catalytic heating element is hierarchically structured.

7. The catalytic module of claim 6 wherein the hierarchical structuring is achieved by surface treatment that includes at least one of dip coating, corrosion, electroplating, electrooxidation, electroreduction, galvanic exchange, wetness impregnation, or deposition precipitation.

8. The catalytic module of claim 6 wherein the hierarchical structuring is with respect to structure, pore size, composition, surface area, or active materials.

9. The catalytic module of claim 1 wherein at least one of the first spacer, the second spacer, or the insulating housing are ceramic.

10. The catalytic module of claim 1 wherein the conductor is centered in the catalytic heating element.

11. A reactor comprising:
    a plurality of the catalytic modules of claim 1, the plurality of the catalytic modules connected end-to-end forming a passage for reactants through the individual catalytic heating elements;
    an inlet at the proximal end of the reactor for receiving reactants; and
    an outlet at the distal end of the reactor for outputting products generated by the passage of reactants through the individual catalytic heating elements heated through the application of electrical power,
    wherein each conductor applies power to its catalytic heating element independent of the power applied to the other catalytic heating elements.

12. The reactor of claim 11 having a shape configured to promote gas-solid interactions and internal mixing.

13. The reactor of claim 11, wherein power is supplied equally to each of the catalytic heating elements.

14. The reactor of claim 11, wherein power is supplied to each of the catalytic heating elements based on heating requirements.

15. The reactor of claim 11, wherein the reactor is a tube-in-tube configuration having an annulus and a center, wherein:
    the annulus and the center are filled with different materials; and
    the reactor system is a compact, electrically-driven, two-stage reactor system.

16. The reactor of claim 15, wherein the reactor is configured induce an exothermic reaction in the center, release heat from the center, and transfer the released heat efficiently to an endothermic process.

17. A reactor comprising:
    a plurality of the catalytic modules, the plurality of the catalytic modules connected end-to-end forming a passage for reactants through the individual catalytic heating elements;
    an inlet at the proximal end of the reactor for receiving reactants; and
    an outlet at the distal end of the reactor for outputting products generated by the passage of reactants through the individual catalytic heating elements heated through the application of electrical power,
    wherein each conductor applies power to its catalytic heating element independent of the power applied to the other catalytic heating elements,
    wherein each catalytic module of the plurality of catalytic modules comprises:
    an insulating housing comprising a first spacer and a second spacer closing the insulating housing;
    a catalytic heating element contained within the insulating housing and configured to allow for the passage of reactants through the catalytic heating element; and a conductor configured to apply electrical power to the catalytic heating element when electrical power is applied to the conductor, wherein the catalytic heating element is a combination of a heating element and a catalytic material, wherein the reactor is a tube-in-tube configuration having an annulus and a center, wherein:

the annulus and the center are filled with different materials; and the reactor system is a compact, electrically-driven, two-stage reactor system.

18. The reactor of claim 17 having a shape configured to promote gas-solid interactions and internal mixing.

19. The reactor of claim 17, wherein power is supplied equally to each of the catalytic heating elements.

20. The reactor of claim 17, wherein power is supplied to each of the catalytic heating elements based on heating requirements.

21. The reactor of claim 17, wherein the reactor is configured induce an exothermic reaction in the center, release heat from the center, and transfer the released heat efficiently to an endothermic process.

\* \* \* \* \*